(12) United States Patent
Fleck et al.

(10) Patent No.: US 8,739,768 B2
(45) Date of Patent: Jun. 3, 2014

(54) INTRODUCTION OF VENTILATION GASES VIA INDIVIDUAL PASSAGES TO THE INTAKE PORTS

(75) Inventors: Michael B. Fleck, Oakland Township, MI (US); Thomas A. Spix, Rochester Hills, MI (US); Kevin M. Luchansky, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 203 days.

(21) Appl. No.: 13/276,435

(22) Filed: Oct. 19, 2011

(65) Prior Publication Data

US 2013/0098342 A1    Apr. 25, 2013

(51) Int. Cl.
*F02M 25/06* (2006.01)
(52) U.S. Cl.
USPC ......................................................... 123/572

(58) Field of Classification Search
USPC ................. 123/572–574, 41.86, 54.4–54.8
See application file for complete search history.

(56) References Cited

U.S. PATENT DOCUMENTS

| | | | | | |
|---|---|---|---|---|---|
| 3,839,996 | A | * | 10/1974 | DeBiasse | 123/572 |
| 4,656,991 | A | * | 4/1987 | Fukuo et al. | 123/572 |
| 4,712,532 | A | * | 12/1987 | Ura et al. | 123/572 |
| 6,920,869 | B2 | * | 7/2005 | Murata et al. | 123/572 |
| 8,336,529 | B2 | * | 12/2012 | Nakajima | 123/572 |
| 2006/0032486 | A1 | * | 2/2006 | Prasad | 123/572 |

* cited by examiner

*Primary Examiner* — M. McMahon
(74) *Attorney, Agent, or Firm* — Quinn Law Group, PLLC

(57) ABSTRACT

An internal combustion engine includes a plurality of PCV ports formed internally within the engine block and the cylinder head. The PCV ports directly connect a crankcase chamber with each of a plurality of intake ports defined by the cylinder head. The blow-by gases that accumulate within the crankcase chamber are directly vented through the internal PCV ports into the intake ports.

20 Claims, 2 Drawing Sheets

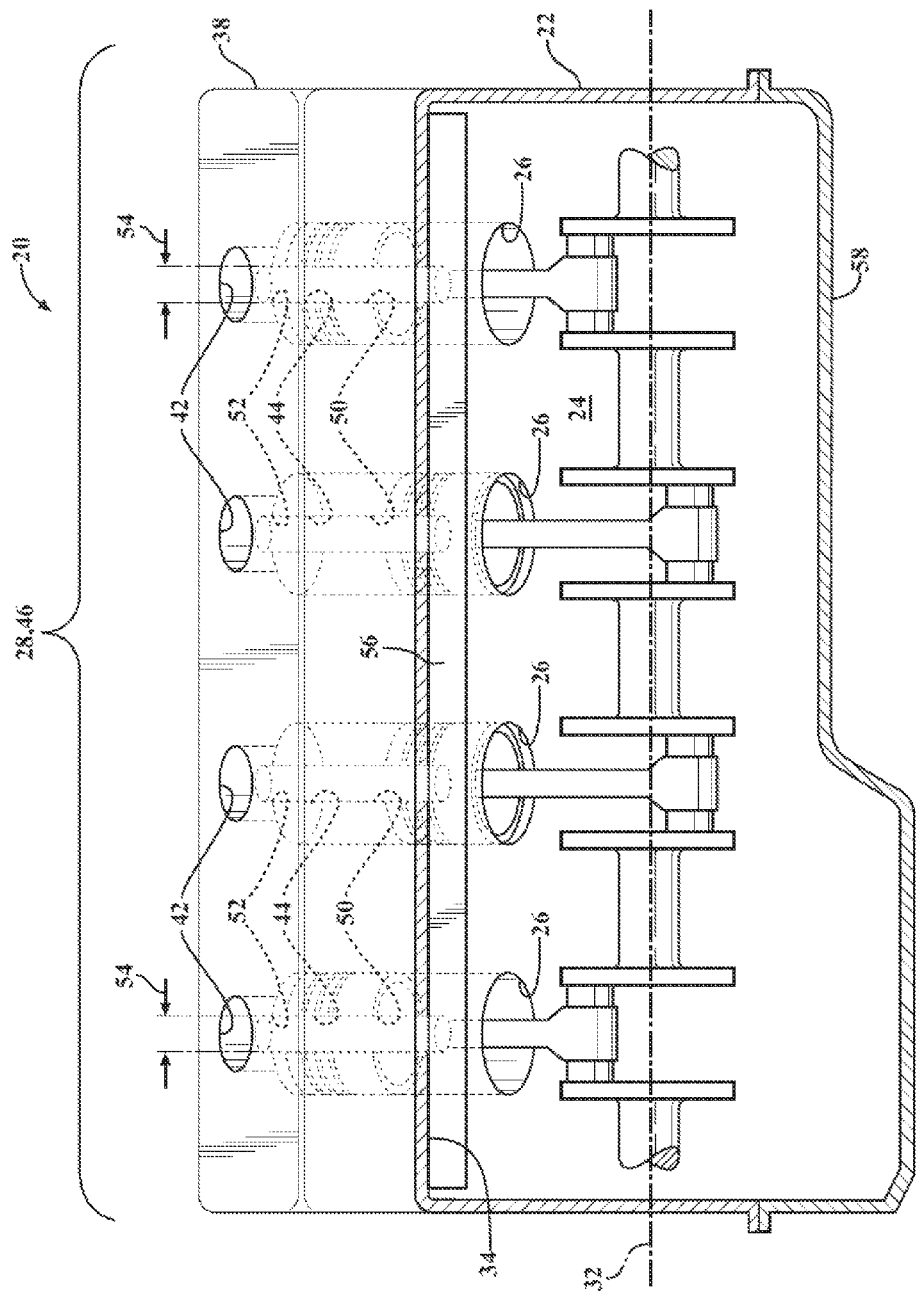

INTRODUCTION OF VENTILATION GASES VIA INDIVIDUAL PASSAGES TO THE INTAKE PORTS

TECHNICAL FIELD

The invention generally relates to an internal combustion engine, and more specifically to a method of venting blow-by gases from a crankcase chamber of the internal combustion engine.

BACKGROUND

Operation of an internal combustion engine generates a small but continual amount of blow-by gases that collect in a crankcase chamber of the internal combustion engine. This occurs when some of the gases generated during combustion leak past the piston rings, and end up in the crankcase chamber. These gases are vented from the crankcase chamber into the intake stream via a closed system, thereby re-circulating the gases to ensure complete combustion of all hydrocarbons and to prevent gas and fluid leakage from the engine.

SUMMARY

An internal combustion engine is provided. The internal combustion engine includes a block that defines a crankcase chamber and at least one bore extending from and in fluid communication with the crankcase chamber. At least one cylinder head is attached to the block. The cylinder head defines at least one intake port in fluid communication with each bore. The block and the cylinder head cooperate to define at least one Positive Crankcase Ventilation (PCV) port that extends internally between and interconnects in fluid communication the crankshaft chamber and the at least one intake port. The PCV port is configured for venting gases from the crankcase chamber into the at least one intake port.

A V-style engine is also provided. The V-Style engine includes a V-style block that defines a crankcase chamber and a plurality of bores extending from and in fluid communication with the crankcase chamber. The plurality of bores is grouped into a first bank of bores and a second bank of bores. The first bank of bores and the second bank of bores are angularly offset from each other about a longitudinal axis of the V-style block. A first cylinder head is attached to the V-style block adjacent the first bank of bores. The first cylinder head defines a plurality of intake ports, with each of the plurality of intake ports of the first cylinder head in fluid communication with one of the bores of the first bank of bores. A second cylinder head is attached to the V-style block adjacent the second bank of bores. The second cylinder head defines a plurality of intake ports, with each of the plurality of intake ports of the second cylinder head in fluid communication with one of the bores of the second bank of bores. The V-style block and the first cylinder head cooperate to define a first group of Positive Crankcase Ventilation (PCV) ports. Each PCV port of the first group of PCV ports extends internally between and interconnect in fluid communication the crankshaft chamber and one of the intake ports of the first cylinder head. Each PCV port of the first group of PCV ports is configured for venting gases from the crankcase chamber into one of the intake ports of the first cylinder head. The V-style block and the second cylinder head cooperate to define a second group of PCV ports. Each PCV port of the second group of PCV ports extends internally between and interconnects in fluid communication the crankshaft chamber and one of the intake ports of the second cylinder head. Each PCV port of the second group of PCV ports is configured for venting gases from the crankcase chamber into one of the intake ports of the second cylinder head.

A method of manufacturing an internal combustion engine is also provided. The method includes forming a plurality of Positive Crankcase Ventilation (PCV) ports internally through a cylinder head and an adjoining engine block to directly interconnect in fluid communication a crankcase chamber defined by the engine block with each of a plurality of intake ports defined by the cylinder head.

Accordingly, the plurality of PCV ports are formed internally within the cylinder head(s) and the block, thereby eliminating all exterior plumbing required to re-direct the blow-by gases from the crankcase chamber to the intake stream. Because the PCV ports are internal to the cylinder head and the block, the PCV ports are unlikely to become plugged with ice during cold weather operation. Additionally, the direct internal PCV ports eliminate parts, thereby reducing assembly time and costs.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic cross sectional view of the internal combustion engine taken parallel to the longitudinal axis of the engine.

DETAILED DESCRIPTION

Figure 1:
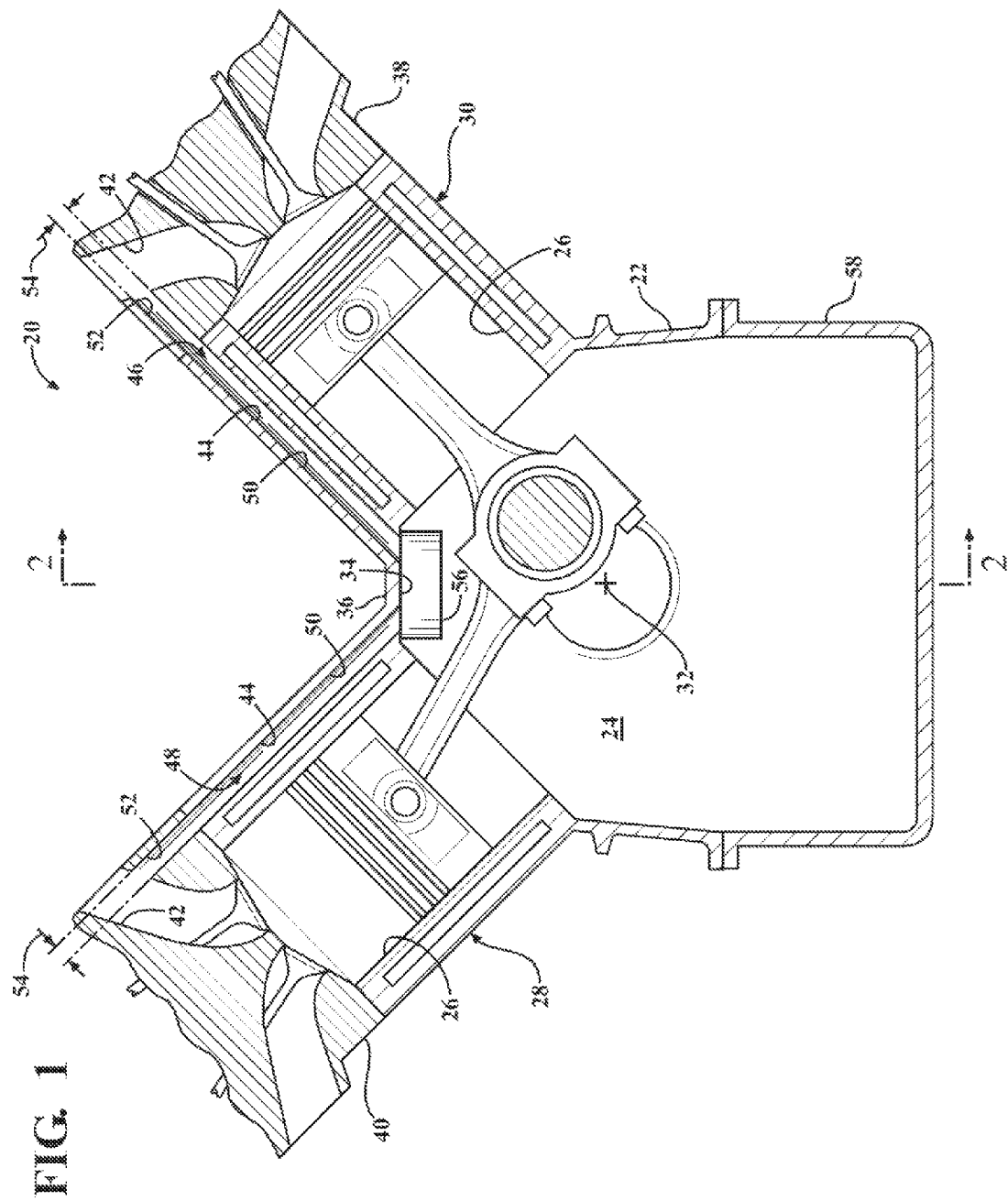
FIG. 1 is a schematic cross sectional view of an internal combustion engine taken perpendicular to a longitudinal axis of the engine.

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, an internal combustion engine is generally shown at 20. The internal combustion engine 20 may include, for example, a diesel engine or a gasoline engine, and operate to generate a torque as is known in the art. Accordingly, the specific operation and the components of the internal combustion engine 20 that are known in the art and not pertinent to the description of the invention are not described in detail herein.

The internal combustion engine 20 includes a block 22. The block 22 defines a crankcase chamber 24, and at least one bore 26 extending from and in fluid communication with the crankcase chamber 24. As shown in the Figures, the block 22 includes a V-style block 22. However, it should be appreciated that the block 22 may include some other style, such as but not limited to an in-line engine block 22. The V-style block 22 shown includes a plurality of bores 26. The bores 26 are grouped into a first bank 30 of bores 26 and a second bank 28 of bores 26. The first bank 30 of bores 26 is angularly offset from the second bank 28 of bores 26 about a longitudinal axis 32 of the V-style block 22. The V-style block 22 defines a valley 34 that is disposed adjacent an upper vertical surface 36 of the block 22, between the first bank 30 of bores 26 and the second bank 28 of bores 26. An oil pan 58 is attached to the block 22 below the crankcase chamber 24.

The internal combustion engine 20 includes at least one cylinder head 38, 40 attached to the block 22 adjacent and generally vertically above the bores 26. The cylinder head 38, 40 defines at least one intake port 42 that is in fluid communication with each of the bores 26. As shown in the Figures, the at least one cylinder head 38, 40 includes a first cylinder head 38 and a second cylinder head 40. The first cylinder head 38 is attached to the V-style block 22 adjacent the first bank 30 of bores 26. The second cylinder head 40 is attached to the V-style block 22 adjacent the second bank 28 of bores 26. The first cylinder head 38 includes a plurality of intake ports 42. Each of the plurality of intake ports 42 of the first cylinder head 38 is in fluid communication with one of the bores 26 of the first bank 30 of bores 26. The second cylinder head 40 also includes a plurality of intake ports 42. Each of the plurality of intake ports 42 of the second cylinder head 40 is in fluid communication with one of the bores 26 of the second bank 28 of bores 26.

The block 22 and the at least one cylinder head 38, 40 cooperate to define at least one Positive Crankcase Ventilation (PCV) port 44. The PCV port 44 extends internally between and interconnects in fluid communication the crankshaft chamber 24 and the intake port 42. As used herein, the term "extends internally" is defined as being formed internally within the various described components, and includes no external components to form the described fluid flow paths. Accordingly, the PCV port 44 defines an internal fluid flow path between the crankcase chamber 24 and one of the intake ports 42 of the cylinder heads 38, 40. As shown, the block 22 and the cylinder heads 38, 40 cooperate to define a plurality of PCV ports 44. More specifically, the first cylinder head 38 and the V-style block 22 cooperate to define a first group 46 of PCV ports 44, and with the second cylinder head 40 and the V-style block 22 cooperate to define a second group 48 of PCV ports 44.

The PCV ports 44 extend generally upward from the valley 34 of the V-style block 22 toward their respective intake port 42. As such, each PCV port 44 of the first group 46 of PCV ports 44 extend generally upward, approximately parallel with the first bank 30 of bores 26, and each PCV port 44 of the second group 48 of PCV ports 44 extending generally upward, approximately parallel with the second bank 28 of bores 26.

Each of the PCV ports 44 includes a first segment 50 and a second segment 52. The first segment 50 of the PCV ports 44 is defined by the block 22, and the second segment 52 of the PCV ports 44 is defined by either the first cylinder head 38 or the second cylinder head 40. The first segment 50 of each of the PCV ports 44 is in fluid communication and aligned with their respective second segment 52 to form each PCV port 44. The PCV ports 44 may each include a diameter 54 that is between the range of 4 mm and 8 mm. It should be appreciated that the PCV ports 44 may all include the same diameter 54, or may alternatively include different diameters 54.

Preferably, the first segment 50 of each of the PCV ports 44 is formed, i.e., machined, into the block 22 using standard machining practices, as such, the first segment 50 of each PCV port 44 may extend along a linear path. Similarly, the second segment 52 of each of the PCV ports 44 is formed, i.e., machined into one of the cylinder heads 38, 40 using standard machining practices. As such, the second segment 52 of each PCV port 44 also extends along a linear path. The linear path of each first segment 50 may differ from the linear path of their respective second segment 52, i.e., the first segment 50 and the second segment 52 of each PCV port 44 need not be aligned along a common linear path, but may each include and define a separate linear path.

During operation of the internal combustion engine 20, combustion gases may accumulate within the crankcase chamber 24. These are often referred to as "blow-by" gases. The PCV ports 44 vent the blow-by gases from the crankcase chamber 24 into the intake ports 42. Oil may become suspended within these blow-by gases. Accordingly, the internal combustion engine 20 may include an air/oil separator 56. As shown, the air/oil separator 56 is disposed within the crankcase chamber 24, adjacent the valley 34 of the V-style block 22, where the blow-by gases and oil suspended therein tend to accumulate within the V-style engine. However, the air/oil separator 56 may alternatively be disposed above the upper vertical surface 36. The air/oil separator 56 separates the suspended oil from the gaseous oil mixture prior to venting the gases through the PCV port 44 and into the intake ports 42. Because the blow-by gases tend to accumulate within the crankcase 24 of the V-style block 22, the gases are vented, i.e., drawn from, the valley 34. The air/oil separator 56 separates the oil from the blow-by gases, allowing the oil to drip back into the crankcase 24. The blow-by gases vented from the crankcase chamber 24 are drawn into the intake ports 42, and thereby into the intake stream for combustion within the bores 26, thereby ensuring that any hydrocarbons within the blow-by gases are burnt prior to being exhausted from the internal combustion engine 20.

While the best modes for carrying out the invention have been described in detail, those familiar with the art to which this invention relates will recognize various alternative designs and embodiments for practicing the invention within the scope of the appended claims.

The invention claimed is:

1. An internal combustion engine comprising:
   a block defining a crankcase chamber and at least one bore extending from and in fluid communication with the crankcase chamber; and
   at least one cylinder head attached to the block and defining at least one intake port in direct fluid communication with the at least one bore;
   wherein the block and the at least one cylinder head cooperate to define at least one Positive Crankcase Ventilation (PCV) port extending internally between and interconnecting in fluid communication the crankshaft chamber and the at least one intake port; and
   wherein the at least one PCV port vents gases from the crankcase chamber directly into the at least one intake port.

2. An internal combustion engine as set forth in claim 1 wherein the at least one PCV port includes a diameter between the range of 4 mm and 8 mm.

3. An internal combustion engine as set forth in claim 1 wherein the block includes a V-style block, with the at least one bore including a plurality of bores grouped into a first bank of bores and a second bank of bores angularly offset from each other about a longitudinal axis of the V-style block.

4. An internal combustion engine as set forth in claim 3 wherein the at least one cylinder head includes a first cylinder head and a second cylinder head, with the first cylinder head attached to the V-style block adjacent the first bank of bores, and the second cylinder head attached to the V-style block adjacent the second bank of bores.

5. An internal combustion engine as set forth in claim 4 wherein the at least one intake port of the first cylinder head includes a plurality of intake ports, with each of the plurality of intake ports of the first cylinder head in fluid communication with one of the bores of the first bank of bores, and wherein the at least one intake port of the second cylinder head includes a plurality of intake ports, with each of the plurality of intake ports of the second cylinder head in fluid communication with one of the bores of the second bank of bores.

6. An internal combustion engine as set forth in claim 5 wherein the at least one PCV port includes a plurality of PCV ports, with the first cylinder head and the V-style block cooperating to define a first group of the plurality of PCV ports, and with the second cylinder head and the V-style block cooperating to define a second group of the plurality of PCV ports.

7. An internal combustion engine as set forth in claim 3 wherein the V-style block defines a valley disposed adjacent an upper vertical surface thereof between the first bank of bores and the second bank of bores, with the at least one PCV port extending upward from the valley toward the intake port.

8. An internal combustion engine as set forth in claim 7 further comprising an air/oil separator disposed within the crankcase chamber adjacent the valley of the V-style block, and configured for separating suspended oil from a gaseous oil mixture prior to venting the gases through the PCV port into the at least one intake port.

9. An internal combustion engine as set forth in claim 1 wherein the at least one PCV port includes a first segment defined by the block and a second segment in fluid communication with the first segment and defined by the at least one cylinder head.

10. An internal combustion engine as set forth in claim 9 wherein each of the first segment and the second segment of the PCV port extend along a linear path.

11. An internal combustion engine as set forth in claim 10 wherein the first segment is machined into the block, and wherein the second segment is machined into the cylinder head.

12. A V-style engine comprising:
a V-style block defining a crankcase chamber and a plurality of bores extending from and in fluid communication with the crankcase chamber, with the plurality of bores grouped into a first bank of bores and a second bank of bores angularly offset from each other about a longitudinal axis of the V-style block;
a first cylinder head attached to the V-style block adjacent the first bank of bores and defining a plurality of intake ports, with each of the plurality of intake ports of the first cylinder head in direct fluid communication with one of the bores of the first bank of bores;
a second cylinder head attached to the V-style block adjacent the second bank of bores and defining a plurality of intake ports, with each of the plurality of intake ports of the second cylinder head in direct fluid communication with one of the bores of the second bank of bores;
wherein the V-style block and the first cylinder head cooperate to define a first group of Positive Crankcase Ventilation (PCV) ports, with each PCV port of the first group of PCV ports extending internally between and interconnecting in fluid communication the crankshaft chamber and one of the intake ports of the first cylinder head, with each PCV port of the first group of PCV ports configured for venting gases from the crankcase chamber directly into one of the intake ports of the first cylinder head; and
wherein the V-style block and the second cylinder head cooperate to define a second group of PCV ports, with each PCV port of the second group of PCV ports extending internally between and interconnecting in fluid communication the crankshaft chamber and one of the intake ports of the second cylinder head, with each PCV port of the second group of PCV ports configured for venting gases from the crankcase chamber directly into one of the intake ports of the second cylinder head.

13. A V-style engine as set forth in claim 12 wherein each PCV port of the first group of PCV ports and the second group of PCV ports includes a diameter between the range of 4 mm and 8 mm.

14. A V-style engine as set forth in claim 13 wherein the V-style block defines a valley disposed adjacent an upper vertical surface thereof between the first bank of bores and the second bank of bores, with each PCV port of the first group of PCV ports extending upward approximately parallel with the first bank or bores, and with each PCV port of the second group of PCV ports extending upward approximately parallel with the second bank of bores.

15. A V-style engine as set forth in claim 14 further comprising an air/oil separator disposed within the crankcase chamber adjacent the valley of the V-style block, and configured for separating suspended oil from a gaseous oil and blowby mixture prior to venting the gases through the first group of PCV ports and the second group of PCV ports.

16. A V-style engine as set forth in claim 12 wherein each PCV port of the first group of PCV ports includes a first segment defined by the V-style block and a second segment in fluid communication with the first segment and defined by the first cylinder head, and wherein each PCV port of the second group of PCV ports includes a first segment defined by the V-style block and a second segment in fluid communication with the first segment and defined by the second cylinder head.

17. A V-style engine as set forth in claim 16 wherein each of the first segment and the second segment of each of the PCV ports extend along a linear path.

18. A method of manufacturing an internal combustion engine, the method comprising:
forming a plurality of Positive Crankcase Ventilation (PCV) ports internally through a cylinder head and an adjoining engine block to directly interconnect in fluid communication a crankcase chamber defined by the engine block with each of a plurality of intake ports defined by the cylinder head.

19. A method as set forth in claim 18 wherein forming the plurality of PCV ports includes machining a first segment of each of the PCV ports into the block and machining a second segment of each of the PCV ports into the cylinder head, wherein one of the first segments aligns with one of the second segments to form each PCV port.

20. A method as set forth in claim 19 wherein:
the engine block includes a V-style engine block defining a plurality of bores grouped into a first bank of bores and a second bank of bores angularly offset from each other about a longitudinal axis of the V-style block;
the cylinder head includes a first cylinder head attached to the V-style block adjacent the first bank of bores and a second cylinder head attached to the v-style block adjacent the second bank of bores; and
the V-style block defines a valley disposed adjacent an upper vertical surface thereof between the first bank of bores and the second bank of bores, with each of the plurality of PCV ports extending upward from the valley toward the intake port in one of the first cylinder head or the second cylinder head.

* * * * *